United States Patent Office 3,238,949
Patented Mar. 8, 1966

3,238,949
COMBINATION FEED MEANS AND AUXILIARY THRESHING CYLINDER FOR A THRESHER
John S. Jarvis, Ipswich, England, assignor to Ransomes Sims & Jefferies Limited, Suffolk, England, a British company
Filed Jan. 27, 1965, Ser. No. 428,427
Claims priority, application Great Britain, Jan. 31, 1964, 4,232/64
8 Claims. (Cl. 130—27)

This invention relates to grain threshing mechanisms.

One of the factors which limits the rate at which a crop can be harvested by means of a combine harvester is the rate at which threshing can be effected between the drum and concave of its threshing mechanism. To achieve the maximum amount of separation in this part of the mechanism the drum is made of as large a diameter as possible so that the length of path for crop between the drum and concave, and hence the time during which it is subjected to a threshing action, is as large as possible.

While it is being carried round by the drum the speed of the crop is increased up to the peripheral speed of the drum so that it becomes more difficult for the threshed grain mixed in with the crop to pass through the concave. Consequently, when the capacity of the threshing mechanism is exceeded, some of the grain will pass over the rearward end of the concave and on to the straw shakers. The latter have a low efficiency for separating grain from straw, particularly when large quantities of crop are being treated, and accordingly most of the grain left in the straw is ejected from the rear of the machine with the straw and is lost.

According to the present invention a grain threshing mechanism comprises a rotatable main drum, a concave extending parallel with the periphery of a lower part of the main drum, a rotatable auxiliary drum of diameter smaller than the diameter of the main drum and disposed forwardly thereof, driving means which are adapated to rotate the auxiliary drum at a peripheral speed lower than that of the main drum, crop supply means adapted to urge crop rearwardly beneath the auxiliary drum, which effects an initial threshing of easily separable grain, and towards the main drum and concave, which co-operate to effect the main threshing action on crop fed therebetween, and means for separating initially threshed grain from the crop prior to entry of the crop between the main drum and concave, there being sufficient space for the passage of crop beneath the auxiliary drum substantially to prevent restriction of the flow of crop to the main drum and concave whilst the lower peripheral speed and smaller diameter of the auxiliary drum serve to prevent a substantial build-up of crop between the drums.

The invention will now be described, by way of example, with reference to the accompany drawings, in which:

FIGURE 4 is a section taken along the line IV—IV of FIGURE 3.

Figure 1:
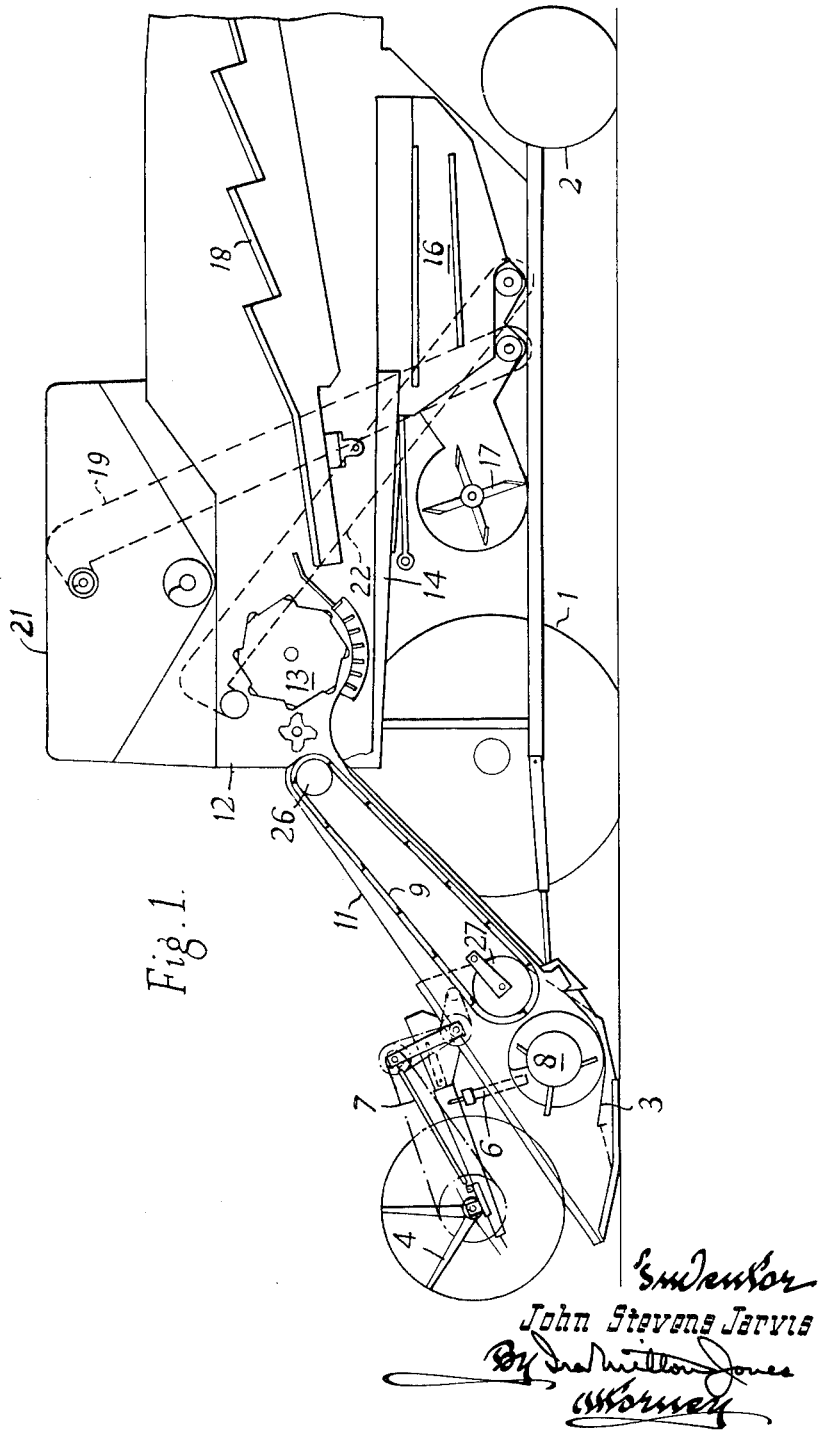
FIGURE 1 is a diagrammatic side elevation, partly in section, of a combine harvester incorporating the invention.

Referring to FIGURE 1, a combine harvester is shown supported on ground engaging front wheels 1 and rear wheels 2 and includes at its forward end a feed table 3 and a reel 4 for feeding crop towards the feed table. The height of the reel 4 relative to the feed table 3 is adjustable by means of a hydraulic ram 6 and mechanism generally indicated at 7 is provided for effecting adjustment of the reel in a direction fore and aft of the machine.

On the feed table 3 is a cutter mechanism (not shown) to the rear of which is a feed auger 8 by the agency of which crop is fed to the lower end of a feed elevator 9. Feed elevator 9 is disposed within an elevator casing 11 secured at its lower end to the rear of the feed table 3 and pivotal relative to the main body 12 of the harvester about a transversely extending axis at the upper end thereof. Pivotal movement of elevator casing 11 and feed table 3 serves to vary the height of the cutting mechanism above the ground to suit crop conditions. The elevator 9 supplies crop to a grain threshing mechanism generally designated 13 on the main body of the harvester. Grain from the threshing mechanism 13 passes to a collecting tray 14 and thence to a dressing shoe 16, where it is subjected to an upwards and rearwards flow of air from a fan 17 for cleaning purposes, whilst straw is discharged to straw walkers 18 for separation therefrom of residual grain. The straw is eventually discharged from the rear of the harvester whilst a grain elevator 19 conveys grain from the dressing shoe 16 to a grain tank 21. A tailings elevator 22 returns unseparated grain and small pieces of straw from the dressing shoe to the grain threshing mechanism 13.

Figure 2:
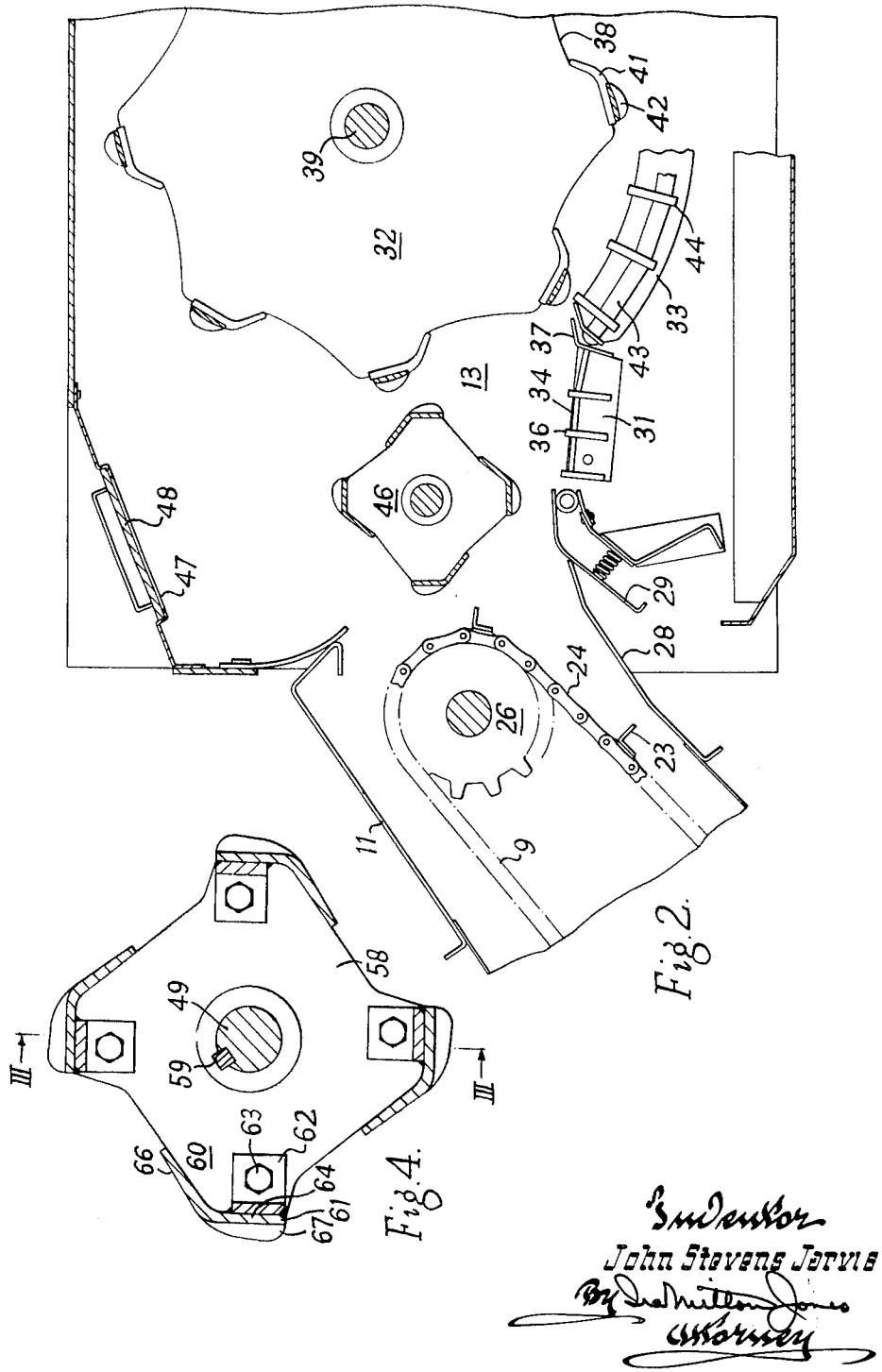
FIGURE 2 is a side elevation of a grain threshing mechanism which forms a part of the harvester of FIGURE 1.

Referring now to FIGURE 2, this shows in more detail the top of the elevator 9 and elevator casing 11, and the grain threshing mechanism 13. The elevator 9 consists of a series of transversely extending ladder bars 23 carried by two or more endless chains 24, each of which extends between an upper chain wheel 26 and lower chain wheel 27 (see FIGURE 1). To provide a smooth passage for crop from the elevator 9 to the grain threshing mechanism 13, irrespective of the angular position of the feed table 3 and elevator casing 11, an upper end of a bottom wall 28 of the casing rests on a spring biassed inlet plate 29.

From the inlet plate 29 a passage for the flow of crop extends over a substantially horizontal inlet grid 31 to a main drum 32 and concave 33 where the major part of the threshing is effected.

The inlet grid 31 is formed of a series of grid wires 34 which extend parallel with the flow of crop and are held in spaced relationship by transversely extending plates 36. This grid is pivotally mounted at its inlet end and is formed at its outlet end with a projecting plate 37 which rests on the concave 33.

The main drum 32 is of conventional form, having a plurality of drum centres, or head plates 38, mounted on a rotatable shaft 39 and a series of eight beater bars 41 each of which extends parallel with the shaft and is secured to the periphery of each drum centre. On its outer surface each beater bar is formed with a series of recesses or flutes 42, the flutes on alternate bars extending rearwardly and to one side of the harvester when the bar is on the lower part of its revolution and those on the remaining bars extending rearwardly and to the left.

The concave 33 is also of known form and comprises a series of arcuate grid wires 43 held in parallel, spaced relationship by transversely extending bars 44. It is disposed immediately below the drum 32 with the grid wires 43 extending parallel with the path of the beater bars 41 during the lower part of their travel. The spacing between the main drum 32 and concave 33 is sufficiently small for the concave to retard the flow of crop and enable an efficient beating action to be effected by the drum.

In the space between top of the elevator casing 11 and the main drum 32 of the threshing mechanism is an auxiliary drum 46 which, like the main drum, is rotatable about an axis which extends transversely of the harvester. This auxiliary drum is not provided with a co-operating concave grid, however, but instead is arranged with its axis forwardly of the inlet end of the inlet grid 31 and is spaced above the grid by a distance greater than the usual spacing between a drum and concave. An inspection port 47 having a cover plate 48 is provided in the wall of the machine, above the auxiliary drum 46.

Figure 3:
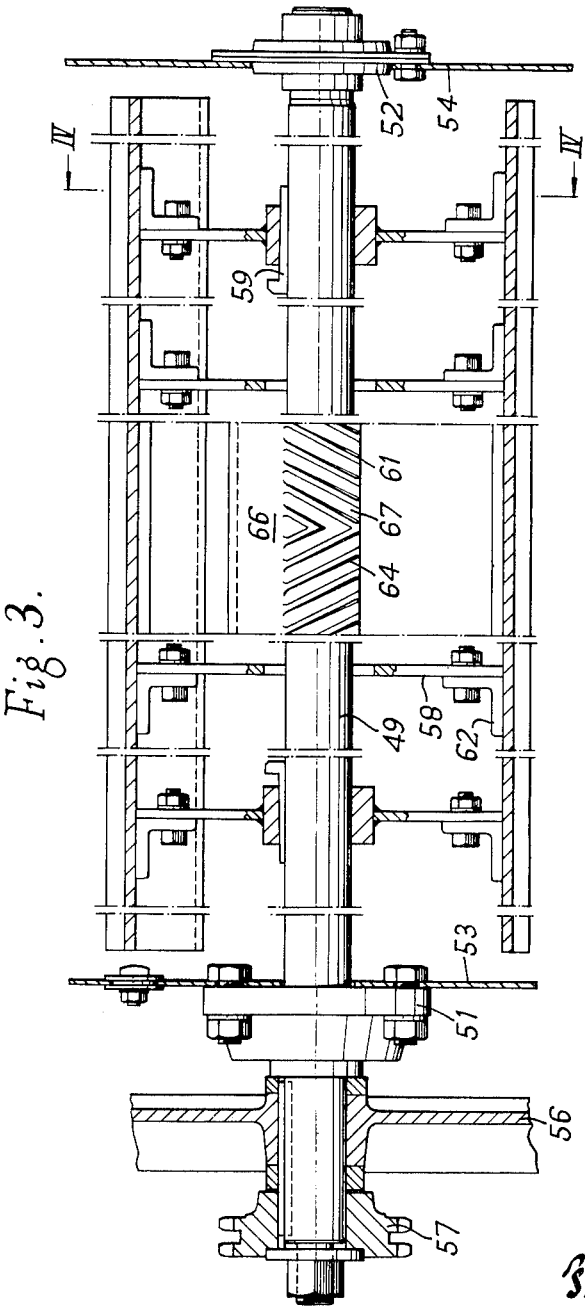
FIGURE 3 is an axial section of an auxiliary drum which forms part of the mechanism of FIGURE 2 and is taken along the line III—III of FIGURE 4.

Referring to FIGURES 3 and 4, the auxiliary drum is mounted on a horizontal shaft 49 which is supported in bearings 51–52 provided in opposite side walls 53 and 54, respectively, of the harvester. One end of the shaft 49 extends outwardly through side wall 53 and keyed thereto is a pulley 56 and a sprocket 57 which provide for the application of belt or chain drive to the drum.

Mounted on the shaft 49 are four drum centres, or head plates, 58 of which two are disposed close to respective side walls of the harvester and the other two are spaced apart therebetween. Each drum centre 58 is keyed to the shaft by a taper key 59 and lies in a plane normal to the shaft. Its radial dimension reaches a maximum at four equi-angularly spaced locations 60, decreasing substantially uniformly with angular distance in one direction away from each location and then increasing rapidly close to the succeeding location. The drum centres are mounted on the shaft with corresponding locations thereon in axial alignment.

Extending parallel with the shaft are four beater bars 61, each having four mounting brackets 62 of angle section welded thereto and spaced apart by amounts corresponding to the spacings between the drum centres 58. Each bar 61 is secured to one set of axially aligned locations 60 by means of bolts 63 which extend through respective brackets and through aligned apertures in the drum centres 58.

The section of the beater bars includes a first part 64 which, in the mounted position of the bar, extends tangentially of the drum, and a second part 66 which extends inwardly to follow the contour of the periphery of a drum centre 58. The outer surface of the first part 64 of the bar is formed with transversely extending recesses or flutes 67 which are arranged in two series on respective halves of the bar. In each series the flutes are arranged to extend rearwardly of the harvester and outwardly towards the adjacent side wall thereof when the beater bar is travelling over the lower part of its travel, adjacent to the concave.

The spacing between the beater bars 61 of the auxiliary drum 46 and its axis, the radius of the drum, is somewhat smaller than the radius of the main drum 32 and the auxiliary drum is driven so that its peripheral speed is approximately one half of the peripheral speed of the main drum.

In operation of the harvester crop cut by the cutting mechanism is conveyed upwardly along the bottom wall 28 of the elevator casing 11 by the ladder bars 23 of the elevator 9 and is then ejected upwardly and rearwardly from the upper end of the casing to impinge against the beater bars 61 of the rotating auxiliary drum 46. The latter serves to assist in sweeping the crop over the inlet plate 29 and downwardly and rearwardly over the inlet grid 31 to the inlet to the space between the main drum 32 and concave 33.

As described above, the auxiliary drum is provided with a series of "fluted" beater bars 61, similar to the beater bars 41 of the main drum 32, rather than with serrated blades in the manner of a feeder beater. These bars 61 therefore perform a less positive feeding action than would the blades of a beater, tending to pass through the mass of straw which issues from the elevator 9. A certain amount of "slipping" therefore takes place between a bar 61 and the straw and this effectively produces a partial "beating" action on the crop. By this action the mature and easily separable grains are threshed by the auxiliary drum.

The proportion of grain separated from crop by the auxiliary drum 46 varies according to the crop conditions but amounts to a significant proportion of the total grain content. A large part of this initially separated grain is collected by the inlet grid 31 whilst the remainder passes on with the rest of the crop to the main drum 32 and concave 33. A greater throughput of crop can therefore be employed whilst still maintaining the amount of separation carried out by the main drum and concave at its normal level.

It will be appreciated that the provision of an auxiliary drum 46 between the elevator 9 and the main drum 32 and concave 33 could lead to difficulty in effecting movement of crop to the main drum and concave. Since the main drum of a harvester is usually between 16" and 18" in diameter the space between the drums, wherein a blockage can build up, is large if the drums are of equal diameter. However, by making the auxiliary drum of smaller diameter than the main drum this space, and hence the possibility of a blockage, is reduced.

The possibility of material not flowing smoothly from the auxiliary drum 46 to the main drum 32 is also reduced by making the peripheral speed of the auxiliary drum less than that of the main drum. This serves to provide a continuous flow of material through the mechanism.

Finally, it will be appreciated that where a concave is provided in conjunction with a drum one action of the concave is to retard the flow of material so that grain in the ear of crop can receive sufficient "beats" by the bars of the drum to enable it to be completely threshed. The spacing between the auxiliary drum 46 and the inlet plate 29 and inlet grid 31 is greater than that between the main drum 32 and concave 33, however, so that movement of crop is not restricted as it flows beneath the auxiliary drum.

The major part of threshing is now effected as the crop passes between the main drum 32 and concave 33 and is subjected to a beating action by the beater bars 41 of the drum and the bars 44 of the concave. Grain threshed in this manner falls through the concave to the collecting tray 14 and in company with that collected by the inlet grid 31 is passed on to the dressing shoe 16. The straw and any remaining grain passes on to the straw walkers 18.

Since the cutting mechanism is much wider than the elevator casing 11 the cut crop has to be compressed into a narrow space at the foot of the casing before it can be conveyed upwardly by the elevator 9. It is not easy, however, to attain a uniform distribution across the width of the elevator casing and inevitably the density of material is greater at the sides than in the centre of the casing. The arrangement of the flutes 67 on the auxiliary drum 46, described above, serves to urge crop inwardly away from the side walls of the threshing mechanism and thereby tends to provide a more even flow of crop to the main drum and concave.

I claim:
1. A grain threshing mechanism, comprising:
 (A) a rotatable main threshing drum;
 (B) a concave cooperating with the main drum to define a threshing zone beneath the main drum, having its entrance remote from a horizontal plane containing the axis of rotation of the main drum;
 (C) upwardly and rearwardly inclined crop supply means for advancing crop upwardly and rearwardly, said crop supply means having its discharge end at a location spaced a distance ahead of the threshing zone and at substantially the same level as the entrance thereto;
 (D) means for guiding crop discharging from the supply means substantially horizontally rearwardly to the threshing zone;
 (E) a rotatable auxiliary threshing drum of a diameter smaller than that of the main drum, the auxiliary drum including a series of mutually spaced beater bars which are disposed on the periphery of the drum and are each formed on an outer surface thereof with a series of transversely extending flutes;

(F) means mounting the auxiliary threshing drum at a location between the main drum and the discharge end of the crop supply means, with the auxiliary drum spaced a distance sufficiently far above said guide means as to substantially assure against restriction to flow of crops advancing to the threshing zone but to effect initial threshing of easily separable grain in crop travelling horizontally toward the threshing zone;

(G) means for separating from the crop grain threshed prior to entry of the crop into the threshing zone;

(H) and driving means adapted to rotate the auxiliary drum at a lower peripheral speed than that of the main drum, whereby the lower peripheral speed and smaller diameter of the auxiliary drum serves to substantially prevent build up of crop between the drums.

2. A grain threshing mechanism as claimed in claim 1, wherein the separating means is an inlet grid which extends forwardly of the main drum from the forward end of the concave and provides at least part of said guiding means.

3. A grain threshing mechanism as claimed in claim 2, wherein the forward end of the inlet grid is disposed rearwardly of the axis of the auxiliary drum.

4. A grain threshing mechanism as claimed in claim 1, wherein the crop supply means include an upwardly and rearwardly inclined elevator, and the arrangement of the auxiliary drum relative to the elevator and the main drum is such that crop travels upwardly and rearwardly towards the auxiliary drum and then downwardly and rearwardly from the auxiliary drum to the inlet to the space between the main drum and concave.

5. A grain threshing mechanism as claimed in claim 4, wherein the elevator is disposed within an elevator casing whose inclination can be varied by rotating the casing about a transversely extending axis at the upper end thereof, and an inlet plate extends between the upper end of the bottom wall of the casing and the separating means, biasing means being arranged to urge a part of the inlet plate upwardly into engagement with the said upper end so as to provide a smooth passage for crop in spite of variations in inclination of the casing.

6. A grain threshing mechanism as claimed in claim 1, wherein the driving means are arranged to rotate the auxiliary drum at a peripheral speed substantially equal to one half the peripheral speed of the main drum.

7. A grain threshing mechanism as claimed in claim 1, wherein the diameter of the auxiliary drum is substantially equal to one third of the diameter of the main drum.

8. A grain threshing machine as claimed in claim 1, wherein the flutes on each beater bar of the auxiliary drum extend rearwardly and outwardly of the mechanism from a plane normal to the axis of the drum and passing though the center thereof, towards an adjacent side of the mechanism when the bar is within the lower part of its travel, whereby crop is urged inwardly from the sides of the mechanism to provide a desirable distribution of crop in directions parallel to the drum axis and to assure a more even flow to the main drum and concave.

References Cited by the Examiner

UNITED STATES PATENTS

| | | | |
|---|---|---|---|
| 624,378 | 5/1899 | Rands | 130—27 |
| 759,391 | 5/1904 | McGrane | 130—27 |
| 1,408,770 | 3/1922 | Nelson | 130—27.14 |
| 2,301,536 | 11/1942 | Greenwood et al. | 130—27.85 |
| 2,301,578 | 11/1942 | Pilcher et al. | 130—27.34 |
| 2,458,345 | 1/1949 | Cass | 130—27.85 X |
| 2,692,465 | 10/1954 | Dechentreiter | 56—20 |

FOREIGN PATENTS 820,060    9/1959    Great Britain.

OTHER REFERENCES

John Deere Operators Manual, 10–64, 56–20, OM-H 35–954, pages 19–21 and 54 (dated Oct. 1, 1954).

ABRAHAM G. STONE, *Primary Examiner.*

J. O. BOLT, *Assistant Examiner.*